United States Patent [19]

Krawagna

[11] E Re. 30,861

[45] Reissued Feb. 9, 1982

[54] BIASED HINGES

[75] Inventor: Alois A. Krawagna, Toronto, Canada

[73] Assignee: Westhem Corporation Limited, Toronto, Canada

[21] Appl. No.: 70,869

[22] Filed: Aug. 29, 1979

Related U.S. Patent Documents

Reissue of:

[64] Patent No.: 3,720,979
Issued: Mar. 20, 1973
Appl. No.: 744,268
Filed: Jun. 17, 1968

U.S. Applications:

[63] Continuation-in-part of Ser. No. 689,390, Dec. 11, 1967.

[51] Int. Cl.[3] ..... E05D 7/00
[52] U.S. Cl. ..... 16/293
[58] Field of Search ..... 16/128 R, 145, 180, 16/184, 150, DIG. 13; 24/173; 223/93

[56] References Cited

U.S. PATENT DOCUMENTS

| | | | |
|---|---|---|---|
| 3,009,169 | 11/1961 | Bodner | 4/240 |
| 3,289,877 | 12/1966 | Wolf | 16/150 |
| 3,292,223 | 12/1966 | Esposito, Jr. | 24/173 |
| 3,628,215 | 12/1971 | Everburg | 16/150 |

FOREIGN PATENT DOCUMENTS

| | | |
|---|---|---|
| 930934 | 7/1963 | United Kingdom . |
| 1056999 | 2/1967 | United Kingdom . |

*Primary Examiner*—Doris L. Troutman
*Attorney, Agent, or Firm*—Kane, Dalsimer, Kane, Sullivan and Kurucz

[57] ABSTRACT

A snap-hinge in which two hinge members are hinged together about a first hinge line. A resilient connecting link is joined at one end integrally to one of the hinge members at a second hinge line and is hinged at the other end to the other hinge member at a third hinge line. The connecting link is capable either of compression or [of expansion] *deformation* as between its two ends, and tends to maintain the hinge members in a given angular relationship, and to return the hinge members to that relationship if they depart from it.

15 Claims, 22 Drawing Figures

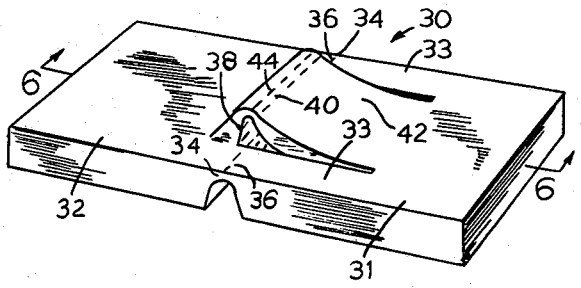
FIG. 5
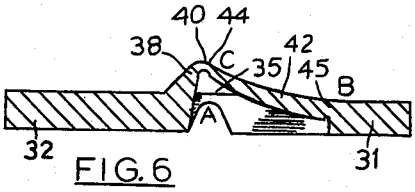
FIG. 6
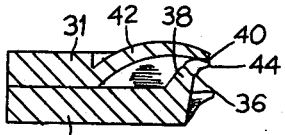
FIG. 7
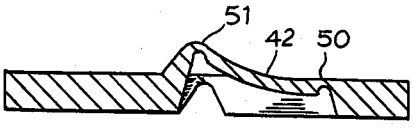
FIG. 8
FIG. 9
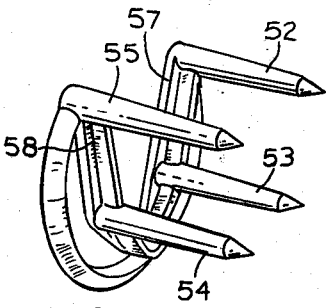
FIG. 10
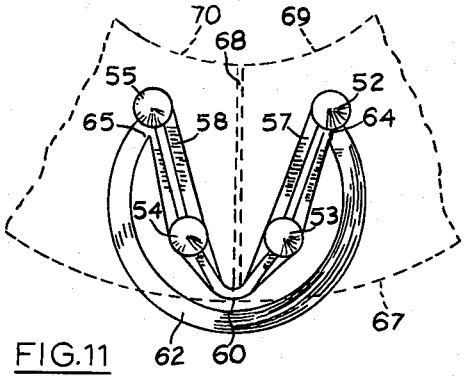
FIG. 11

BIASED HINGES

Matter enclosed in heavy brackets [ ] appears in the original patent but forms no part of this reissue specification; matter printed in italics indicates the additions made by reissue.

This application is a continuation-in-part of U.S. application, Ser. No. 689,390, "Improvements in Biased Hinges," filed Dec. 11, 1967, Alois A. Krawagna.

This invention relates to biased hinges, or "snap-hinges" as they are sometimes called, in which the hinge tends to hold itself in a closed position and/or an open position.

Snap-hinges of the type to which this invention relates include two hinge members hinged to one another, and a biasing member extending between and hinged to both hinge members at points spaced from the hinge line between the hinge members. In accordance with the invention, two basic types of biasing member can be utilized: the first is a biasing member adapted to undergo compression as between its two ends; the second is a biasing member adapted to undergo [expansion] *deformation* as between its two ends. With regard to both the compression and the [expansion] *deformation* types of biasing members, this invention provides that at least one end of the biasing member be integral with its particular hinge member.

In accordance with one embodiment of this invention, the two hinge members are pivoted together, and the biasing member is adapted to undergo compression. The biasing member is pivoted to one of the hinge members but integral with the other. This permits the hinge member with which the biasing member is integral to be moulded as a single unit adapted for use with one of a variety of rigid members constituting the other hinge member.

In accordance with the second embodiment of this invention, the two hinge members are integral with one another through a web constituting the hinge line about which the hinge members articulate, and the biasing member is integral with one of the hinge members through a web constituting a second hinge line, and is integral with the other hinge member at a point constituting a third hinge line, the biasing member being adapted to undergo compression. With this arrangement, the compression force on the biasing member tends to urge the two hinge members away from one another when the hinge is articulated. This feature is particularly advantageous in that it places the web portion joining the two hinge members in tension, and avoids the danger of shearing which accompanies compression in the web.

In accordance with a fourth embodiment of this invention, there is provided a one-piece, integral snap-hinge wherein the biasing member undergoes [expansion] *deformation*, the two hinge members being connected through an integral web constituting the hinge line about which the hinge members articulate. The biasing member has its opposite ends integral with the two hinge members through webs constituting further hinge lines. The further hinge lines are spaced from the first hinge line.

In accordance with a forth embodiment of this invention, there is provided a snap-hinge in which one of the hinge members consists of two separate but interlocking parts. The other hinge member is a one-piece unit, and the construction of the whole is such that the biasing member links the one-piece hinge member with one part of the other hinge member, and the one-piece hinge member is adapted to engage the other part of the other hinge member to hold the two parts firmly in interlocking engagement with one another. The one-piece hinge member can be removed from engagement with the other part, thereby permitting the two parts of the two-part hinge member to be separated completely from one another.

This invention also provides a method for making by the extrusion method a snap-hinge in which the biasing member undergoes [expansion] *deformation.*

Specifically, this invention provides a snap-hinge, comprising: a first hinge member, a second hinge member hinged to said first hinge member about a first hinge line, a resilient connecting link joined at one end integrally to said first hinge member at a second hinge line and hinged at the other end to said second hinge member at a third hinge line, the resilient connecting link tending resiliently to maintain its two ends apart at a given spacing, said second hinge line being spaced at an invariable distance from said first hinge line, said third hinge line being spaced at an invariable distance from said first hinge line, the snap-hinge having a position in which stress in the connecting link is at a minimum, the snap-hinge being at rest in said position, a small departure from which increases the stress in the connecting link, which tends to restore the snap-hinge to said position.

The embodiments of this invention are shown in the accompanying drawings, in which like numerals denote like parts throughout the several views, and in which:

FIG. 5 is a perspective view of the second embodiment of this invention;

FIG. 6 is a sectional view taken at the line 6—6 in FIG. 5;

FIG. 7 is a sectional view of the hinge shown in FIG. 5, with the hinge members closed against one another;

FIG. 8 and 9 show two modifications of the second embodiment of this invention;

FIG. 10 is a perspective view of one form of the third embodiment of this invention;

FIG. 11 is a frontal view of the embodiment shown in FIG. 10;

Figure 1:
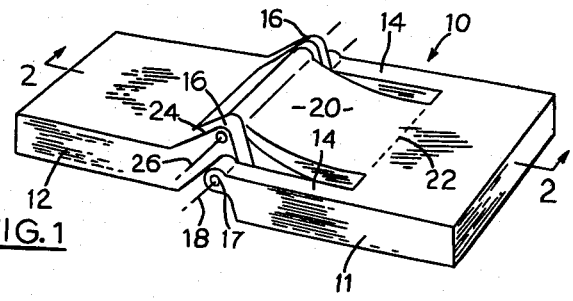
FIG. 1 is a perspective view of one embodiment of this invention.

FIG. 1 shows a hinge 10, generally comprising a first hinge member 11 and a second hinge member 12. The first hinge member 11 has two parallel arms 14 extending leftwardly from the hinge member 11, the arms 14 being rigid with respect to the hinge member 11. The second hinge member 12 has two rightwardly protruding appendages 16, which are rigid with respect to the hinge member 12. The arms 14 each carry a pivot pin 17 (only one visible in FIG. 1) by which the arms 14 are pivoted to the appendages 16. Thus, the second hinge member 12 is hinged to the first hinge member 11 about a first hinge line 18, which constitutes the common axis of the pins 17. The first hinge member 11 has a resilient connecting link 20 integral therewith between the arms 14, and extending leftwardly toward the second hinge member 12. It will be noted that the location 22 at which the resilient connecting link 20 is integral with the hinge member 11 is spaced from the first hinge line 18.

The resilient connecting link 20 has a pin 24 passing therethrough at its left-hand end, and the ends of the pin 24 are pivoted to the appendages 16 at a location spaced from the first hinge line 18. The axis of the pin 24 constitutes a second hinge line 26. It is essential to this invention that the first and second hinge lines 18 and 26 be spaced rigidly from one another.

Figure 2:
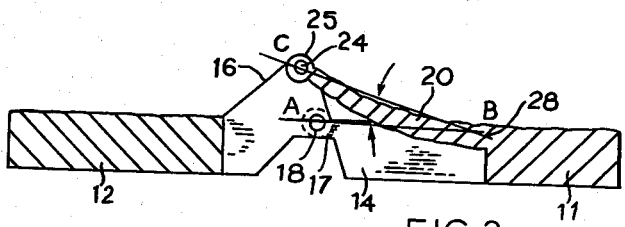
FIG. 2 is a sectional view taken along the line 2—2 in FIG. 1.

Turning now to FIG. 2, it will be seen that the right-hand end of the connecting link 20 is rigidly integral with the first hinge member 11, since the connecting link 20 does not decrease in thickness to form a flexible web where it joins the hinge member 11. By comparison, a glance at FIGS. 8 and 9 shows the connecting link to be hingedly integral with the hinge member, due to the flexible web portion connecting them.

Returning to FIG. 2, it is assumed here that the position of the hinge members 11 and 12 shown is the normal "at-rest" open position for the hinge, with the hinge members being 180° apart. In this position, the connecting link 20 is subject to the least compression bowing stress of any position between FIG. 2 and FIG. 4. If the first hinge member 11 is formed with the integral connecting link originally parallel with the arm members 14, some bowing stress will be introduced into the link 20 when its left-hand end is raised and pivoted to the appendages 16 along the second hinge line 26. Alternatively, the first hinge member 11 can be formed with the resilient connecting link 20 already in the slightly curved configuration shown in FIG. 2. It will be noted that the arms 14 and the hinge member 11 are considerably thicker in the vertical direction than is the connecting link 20. The purpose of the relative difference in thicknesses is to make the connecting link 20 a relatively resilient or bendable member, as compared to the more rigid hinge member 11 and arms 14, even though the hinge member 11, the arms 14 and the connecting link 20 are all formed of the same material.

As the first hinge member 11 begins to pivot in the counter-clockwise direction with respect to the second hinge member 12, it will be obvious that, due to the spacing between the hinge lines 18 and 26, the ends of the resilient connecting link 20 will be urged together to place the link in compression, and the result will be a compression bowing in the connecting link 20.

Figure 3:
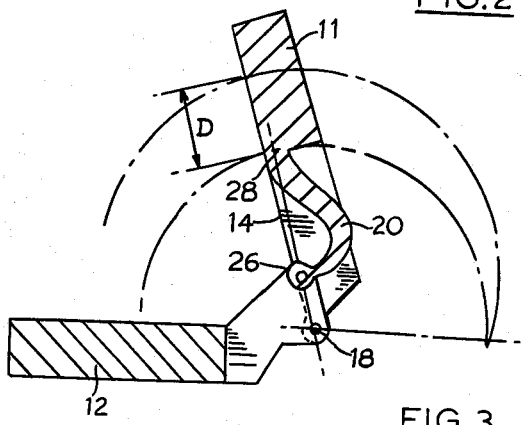
FIG. 3 is a sectional view of the hinge shown in FIG. 2, with one hinge member hinged to an intermediate position with respect to the other hinge member.

FIG. 3 shows the bowing of the resilient connecting link 20 at its maximum, and this is determined by the alignment of the hinge lines 18 and 26 and the point 28, which can be considered the approximate point of attachment between the resilient connecting link 20 and the first hinge member 11. The geometry of the system is such that the two ends of the resilient connecting link 20 are closest when the point 28 is lined up with the hinge lines 18 and 26. The amount by which the rectilinear distance between the ends of the connecting link is shortened in FIG. 3 is shown as D. As the first hinge member 11 moves leftwardly in the counter-clockwise direction past the FIG. 3 position, the resilient connecting link 20 begins to straighten out, but it is still not completely relieved of compression bowing stress when the hinge members 11 and 12 have closed upon one another. The reason for this is the fact that the hinge line 26 is slightly to the left of the hinge line 18. Explanations of this intentional residual compression spring loading and other angular travel relationships are contained in later paragraphs.

Returning to FIG. 2, it will be appreciated that, because the hinge line 26 is spaced upwardly from the hinge line 18, as soon as the hinge member 11 begins to pivot in the counter-clockwise direction above the hinge line 18 and compress the resilient connecting link 20, the latter will exert a force on the first hinge member 11 tending to return it to the FIG. 2 position. The torque T tending to return the first hinge member 11 to its FIG. 2 position will be given by the relationship:

$$T = FL (\sin \phi)$$

where L is the distance between the hinge line 18 and the point 28, F is the compressive force exerted on the resilient connecting link 20, and $\phi$ is the angle in the vertical plane subtended at the point 28 by the hinge lines 18 and 25. The angle $\phi$ is shown in FIG. 2.

It will be appreciated that, when the first hinge member 11 has reached the FIG. 3 position, where the point 28 is lined up with the hinge lines 18 and 26, the angle $\phi$ drops to zero, and the restoring torque T likewise drops to zero. Thus, when the hinge is in the FIG. 3 position, it is in a condition of unstable equilibrium. As the first hinge member 11 moves past the FIG. 3 position in the counter-clockwise direction, the angle $\phi$ increases from zero to a finite value, and causes a torque in the counter-clockwise direction which is also given by the expression above. Because the resilient connecting link 20 is still under some compression in the FIG. 4 position, the hinge members 11 and 12 are urged together in the FIG. 4 position.

It will be appreciated that the second hinge member 12 need not be in the exact shape shown, since its sole function is to provide connecting portions for the pivot pins 17 and 24.

Turning now to FIG. 5, which shows the second embodiment of this invention, it will be seen that a hinge shown generally at 30 comprises a first hinge member 31 and a second hinge member 32. The first hinge member 31 has two arm members 33 extending toward the second hinge member 32, and each of the arm members 33 is integral, at its left-hand end, with the second hinge member 32 through a web 34, the thin central portion of which defines a first hinge line 36. Between the two webs 34, the second hinge member 32 has a rigid upstanding extension 38, of which the upper portion is integral through a web 40 with the left-hand end of a resilient connecting link 42, of which the right-hand end is rigidly integral with the first hinge member 31, as best seen in FIG. 6. The web 40 defines a second hinge line 44, and the point 45 is the approximate point of attachment between the link 42 and the member 31. The same expression for the opening or closing torque T applies for this embodiment as for the embodiment shown in FIGS. 1 to 4. The second embodiment of the hinge has not been shown in a position similar to FIG. 3, since the same configuration would result and the geometric considerations would be the same. FIG. 7 shows the second embodiment in the position corresponding to FIG. 4 for the first embodiment, and it will be appreciated again that, since the second hinge line 44 is located slightly to the left of the first hinge line 36, the resilient connecting link 42 is still under some compression in the FIG. 7 position, and thus there will be a force tending to urge the hinge members 31 and 32 together in the FIG. 7 position.

In this second embodiment, it will be appreciated that the action of the resilient connecting link 42 is at all times to place the web 34 in tension. This is an advantage because if the web 34 were in compression, there would be a danger of overlapping and shearing with repeated flexings.

FIGS. 8 and 9 show alternative designs for the resilient connecting link 42. In FIG. 8, the link 42 is slightly bowed concave upwardly in its unstressed position, and there is a web 50 at the right-hand end as well as a web 51 at the left-hand end where the link 42 joins the projection 38. FIG. 9 is similar to FIG. 8, except that the resilient connecting link is convex upwardly in its unstressed condition. Again, there is a web 50 at the right-hand end of the link 42, with a web 51 at the left-hand end.

Figure 4:
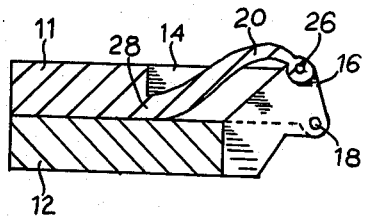
FIG. 4 is a sectional view of the hinge shown in FIGS. 2 and 3, with the hinge members closed together.
Figure 12:
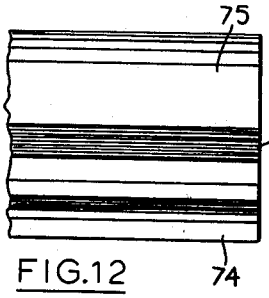
FIG. 12 is an elevational view of an extruded form of the third embodiment of this invention.

In the discussion that follows the snap-hinges shown in FIGS. 1 through 9 will be considered to have three parallel bending lines: line A, representing the lines 18 and 36; line B, representing the lines 28 and 45; and line C, representing the lines 26 and 44. The letters A, B and C are shown in FIGS. 2 and 6. For purposes of this description, bending lines A and B are located in the same initial horizontal plane. As pointed out earlier, the location of bending line C to the left of bending line A results in residual compressive stress in the resilient connecting link when the hinge is in the closed position, because mechanical interference between the first and the second hinge member prohibits rotation of the first hinge member to the other location of completely relieved compression bowing stress. The obvious advantage of clamping closure force between the hinge members results. FIGS. 4 and 7 illustrate this condition of rotation, mechanically stopped at 180° travel of the first hinge member.

It will be further realized that as bending line C is angularly displaced in the counter-clockwise direction, with bending lines A and B still in the same horizontal plane, a configuration will be arrived at wherein the first hinge member reaches closure (mechanical interference) just as the bending lines A, C and B become aligned (angle $\phi$=zero). This configuration will be determined by the initial angulation of the hinge members and the location of the bending line C. These conditions describe an "always open" compression hinge. Another way of putting it is to say that the first hinge member, because of mechanical interference, never goes beyond a position of unstable equilibrium.

Still further analysis of the positional relationship of the bending lines contemplated by this invention reveals that as bending line C moves clockwise and goes to the right of the vertical at the bending line A, it is possible to select specific values of angular travel between 0° and 180° for the first hinge member. Also, as C moves counter-clockwise to the left with respect to the vertical at bending line A, unstopped angular travel of the first hinge member will be greater than 180° and specific values between 180° and 360° may be selected. "Unstopped angular travel" is a hypothetical situation in which no mechanical interference between the two hinge members takes place. Bending line C, it will be noted, is always located on the bisector of the angle describing unstopped first hinge member travel. Assuming the moment of inertia and the modulus of elasticity of the connecting link to be known, spring force may also be computed.

It will thus be appreciated that, when the snap-hinge is formed in manufacture with the hinge members at a designated angular relationship, and rotation of the first hinge member is intended to bring the two hinge members together, it is possible to provide a predetermined closure force to be exerted by the connecting arm, by selecting the appropriate material and dimensions for the latter. Also, when the hinge members are formed at a designated angular relationship and rotation of the first hinge member brings it to only a portion of the initial angulation before it reaches an "at-rest" position, a determination of this second "at-rest" position can be made.

Those skilled in the art will appreciated that in the event the two hinge members are formed with an angular relationship less than approximately 30° or more than 330°, certain manufacturing complexities will be encountered in the webbed embodiment. Further, an initial angular relationship approaching zero as the limit is of little or no value as far as the purposes of this invention are concerned.

Turning now to FIGS. 10 and 11, there is shown one form of a third embodiment of this invention, in which the connecting link is adapted to undergo [expansion] *deformation* as between its two ends. The hinge shown in FIGS. 10 and 11 is adapted for use with pipe insulation, which is usually available as two semi-cylindrical portions adapted to be clamped together around the pipe. Sometimes the two portions of insulation are joined along one edge by an outer skin bridging between the portions, such that the portions can hinge about that point. In other cases, the two portions are made separately, without any connection or hinge means between them. The hinge device shown in FIGS. 10 and 11 is adapted to be inserted into one end of a length of split insulation, with two prongs 52 and 53 inserted into one portion of the insulation and two prongs 54 and 55 inserted into the other portion thereof. The prongs 52 and 53 project integrally from a first hinge member 57, while the prongs 54 and 55 project integrally from a second hinge member 58. As best seen in FIG. 11, the two hinge members 57 and 58 are integral with one another through a flexible web 60, which is considered to constitute a first hinge line. Both hinge members 57 and 58 are moulded with a cross-section in the shape of a "T," in order to give rigidity to the members 57 and 58. The prongs 52–55 are slightly tapered and pointed, for ease of insertion into the insulation material, which is usually either fiberglass or cellular plastic. A connecting link 62 of circular configuration is joined integrally at one end to the hinge member 57 through an integral web 64 constituting a second hinge line, and is joined at the other end to the second hinge member 58 through a further integral web 66 constituting a third hinge line. The connecting link 62 has, as shown in FIG. 10, a roughly triangular cross-section, although this is not essential.

The position of the snap-hinge of FIG. 10 with respect to the split pipe insulation with which it is used is shown in FIG. 11, in which the pipe insulation has been shown in broken lines. The snap-hinge is positioned with the web 60 lying adjacent the intersection of the outer periphery 67 of the pipe insulation and the split line 68 between the two portions 69 and 70 of the pipe insulation. The prongs 52–55 are symmetrically arranged with respect to the split line 68, and inserted into the insulation material. The snap-hinge thus acts as a hinge between the two portions 69 and 70, which articulate about the web 60, while the connecting link 62 serves as a spring tending to maintain the two portions 69 and 70 in their closed position (that shown in broken lines in FIG. 11).

If it were desired to have a positive closure force exerted on the portions 69 and 70 when they are in the closed position, the hinge members 57 and 58 would be spread apart to some extent before insertion of the prongs 52–55, such that the rectilinear distance between the prongs 52 and 55 is greater than the distance between them in the unstressed condition.

If the two portions 69 and 70 of the pipe insulation, with the pronged snap-hinge of FIG. 10 inserted in one end as described above, were now to be gradually spread apart, articulating about the web 60, the connecting link 62 would be resiliently [expanded] *deformed*, and would try to urge the two portions back together. If, however, the two portions 69 and 70 were spread far enough apart that the prongs 52, 53, 54 and 55 were brought into line with one another, the force exerted by the connecting link 62 would no longer urge the portions 69 and 70 together, since the snap-hinge would be in a state of unstable equilibrium. If the portions 69 and 70 were expanded beyond the position in which unstable equilibrium occurs, the connecting link 62 would urge the portions 69 and 70 toward an open position.

Thus, by applying a snap-hinge of the type shown in FIG. 10 to the end of a length of split pipe insulation (or two: one at either end), the length of split pipe insulation would have a "hold-closed" and a "hold-open" position.

Figure 13:
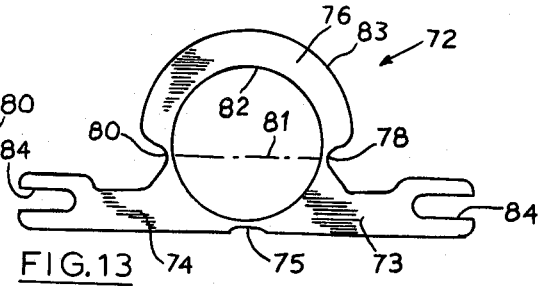
FIG. 13 is a cross-sectional view of the extruded third embodiment shown in FIG. 12.

FIG. 13 shows, in cross-section, an extruded form of the third embodiment of this invention. The cross-section of the extrudate shown generally at 72 in FIG. 13 is composed of two opposed portions 73 and 74 joined by a relatively thin portion 75 constituting a first web in the extrudate. A curved portion 76 is joined to both of the opposed portions 73 and 74 at points spaced from the first web 75. The curved portion 76 is joined to the portion 73 through a thin portion 78 constituting a second web in the extrudate, and is joined to the portion 74 through a thin portion 80 constituting a third web in the extrudate. The curved portion 76 lies to one side of the hypothetical line 81 joining the second web 78 and the third web 80. The first web 75 lies on the other side of the hypothetical line 81 and is spaced therefrom. The characteristics described above are essential to a hold-open, hold-closed extruded snap-hinge in which the connecting link undergoes [expansion] *deformation*. As can be seen, the curved portion 76 has a circular curvature, although this is not essential. What is essential is that the straightened length of the curved portion 76 be at least as long as the sum of the rectilinear distance between the first web 75 and the second web 78 plus the rectilinear distance between the first web 75 and the third web 80. Otherwise the hinge would not be a "-snap-hinge," because the curved portion 76 would be incapable of sufficient [expansion] *deformation* to permit the first, second and third webs 75, 78 and 80 to become aligned. It will be understood that this position of alignment will constitute the state of unstable equilibrium for the snap-hinge, without which the hinge would be able to maintain only one position. The straightened length of the curved portion 76 will lie somewhere between the length of the inside arc 82 and the length of the outside arc 83.

Figure 14:
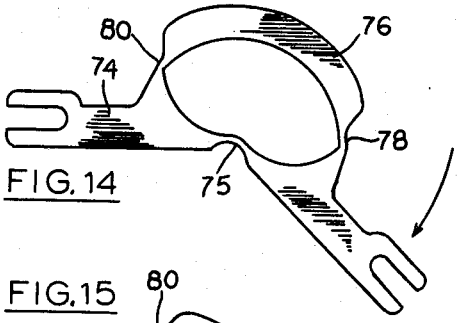
FIG. 14 is a view similar to FIG. 13, showing the two hinge members at an intermediate angular position.
Figure 15:
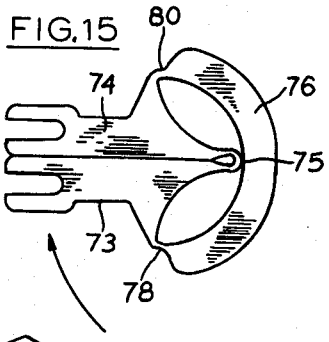
FIG. 15 is a view similar to FIGS. 13 and 14, showing the two hinge members closed against one another.

FIGS. 14 and 15 show the extruded snap-hinge in, respectively, an intermediate hinged position, and the closed position in which the portions 73 and 74 are closed against one another. It will be noted that, in FIG. 14, the curved portion 76 [is expanded] *deforms* to a radius of curvature greater than that which it has in either FIG. 13 or FIG. 15.

The opposed portions 73 and 74 are each equipped with a slot 84 capable of receiving and gripping an appropriate plate-like element, the two plate-like elements so gripped being snap-hinged together by the extruded snap-hinge about the web 75.

The method according to this invention involves the steps of extruding an integral extrudate from stiff but resilient material such as polypropylene, which extrudate has a cross-section meeting the criteria set out above, and cutting the extrudate transversely to obtain a section thereof.

Figure 16:
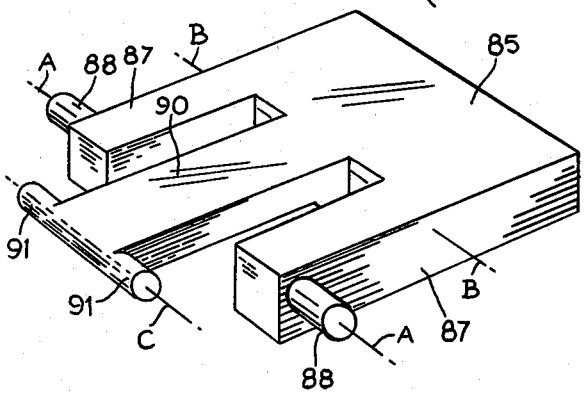
FIG. 16 is a perspective view of a special form of the first embodiment of this invention.

FIG. 16 shows a special form of the first embodiment of this invention. Only the first hinge member 86 is shown. The hinge member 86 has two spaced-apart arms 87 supporting outwardly projecting pivot pins 88 at their extremities. Between the arms 87 is a connecting link 90 which has two opposed, aligned pivot pins 91 at its end. The connecting link 90 is thinner than the arms 87, such that the connecting link 90 is resilient by comparison with the arms 87. The hinge member 86 is adapted to be pivotally connected to another rigid hinge member (not shown) through the pivot pins 88, the common axis of which constitutes the first bending line A. The connecting link 90 is also adapted to be pivotally connected to the other rigid hinge member through the pivot pins 91, the common axis of which constitutes the third bending line C. The line B in FIG. 16 represents the approximate point of attachment between the connecting link 90 and the hinge member 86 and is considered to be the second bending line of the hinge. In the "at-rest" position the lines A, B and C are in alignment, with A intermediate B and C. This arrangement gives a 360° hinge configuration, in which the connecting link 90 begins to undergo compression as soon as the hinge member 86 begins to pivot with respect to the other hinge member, regardless of the direction of pivoting. It will be appreciated that this hinge configuration has only one "at-rest" position, and that the position of unstable equilibrium arises at 180° displacement from the "at-rest" position.

Figure 17:
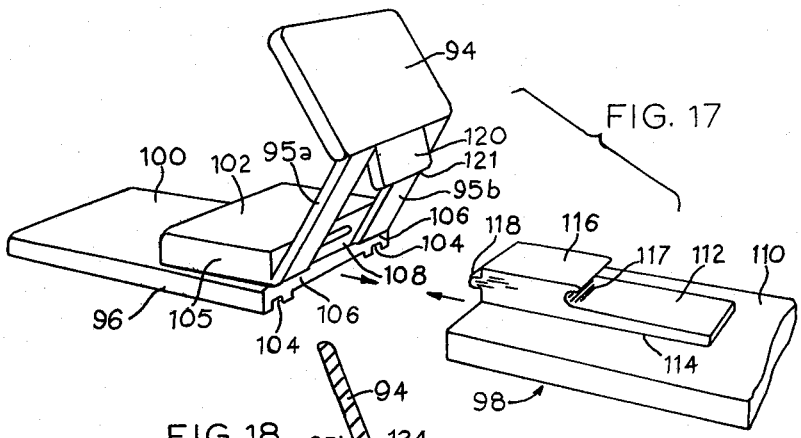
FIG. 17 is a perspective view of one variant of the fourth embodiment of this invention, showing the two portions of the two-part hinge member in spaced relation.

Turning now to FIG. 17, the first variant of the fourth embodiment of this invention is seen to include a first hinge member 94, a split biasing member consisting of two portions 95a and 95b, and a second hinge member consisting of a first part 96 and a second part 98. In one application of the fourth embodiment of this invention, the parts 96 and 98 constitute, respectively, the two free ends of a split sealing ring adapted to close the periphery of tape reels against the entry of dust and other foreign material. These sealing rings, and the tape reels with which they are used, are widely employed in the data-processing field. Thus, while the following description assumes that the parts 96 and 98 are distinct, separate items, this does not preclude an arrangement wherein the two parts are linked remotely, as in a circular sealing ring of the above type.

Attention is now directed specifically to the part 96, which consists of a base portion 100, and a surmounting portion 102. The base portion 100 is a flat, band-like, elongated element having two parallel grooves 104 which are adapted to receive the peripheries of the two circular plates constituting a tape reel (not shown). The surmounting portion 102 can be either formed integrally with the base portion 100, or affixed thereto by some other conventional means, such as glueing, welding, or mechanical attachment. The surmounting portion 102 consists essentially of a block-like element 105 to which the portions 95a and 95b of the biasing element are hingedly connected along integral webs 106 which are collinear. As is evident in FIG. 17, the two portions 95a and 95b of the biasing element are spaced apart, and the block-like element 105 has, between the portions 95a and 95b, a groove 108 of which the purpose will presently be explained.

The part 98 consists of a base portion 110 which is identical in cross-section to the base portion 100 of the part 96, surmounted by a locking element 112. Again, the locking element 112 can be either formed integrally with the base portion 110, or affixed thereto by means of glue, welding, mechanical attachment, etc. The locking element 112 consists of a lower portion 114, and an upstanding portion 116. The breadth of the upstanding element 116 is less than the lateral distance between the portions 95a and 95b of the biasing element, such that the portions 95a and 95b can lie on either side of the upstanding portion 116. The portion 116 defines a groove 117 opening remotely from the part 96. Integral with the upstanding portion 116 is a horizontal protuberance 118 which is adapted for complementary engagement with the groove 108.

It will be appreciated that, while in the embodiment shown, the base portions 100 and 110 have identical cross-sections, this is due merely to the particular application of the fourth embodiment to the two free ends of a split sealing ring. Obviously, the base portions 100 and 110 could be replaced with any other abutting members.

The first hinge member 94 has a tongue 120 extending therefrom between the portions 95a and 95b of the biasing element.

Figure 18:
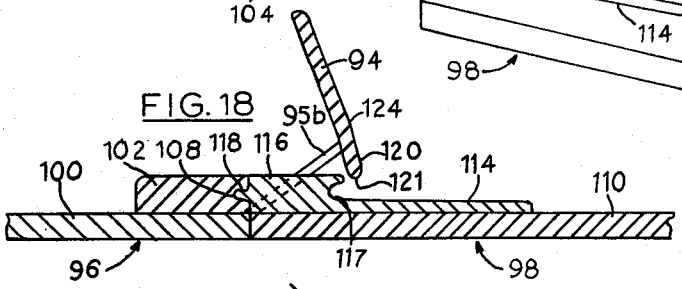
FIG. 18 is a vertical, longitudinal sectional view of the embodiment shown in FIG. 17, with the two portions of the two-part hinge member engaged with one another.
Figure 19:
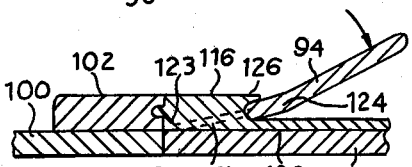
FIG. 19 is a view similar to FIG. 18, showing the locking hinge member at its balance point, about to be urged to the over-toggled locking position.
Figure 20:
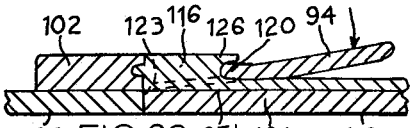
FIG. 20 is a view similar to FIGS. 18 and 19, showing the locking hinge member in the locked position.

FIGS. 18 to 20 show sequential steps in the operation of locking the two parts 96 and 98 together by means of the biased hinge. FIG. 18 shows the two base portions 100 and 110 abutting one another, with the protuberance 118 lodged in the groove 108. When this complementary abutment has taken place, it is then possible to swing the first hinge member 94 downwardly so that the end 121 of the tongue 120 projecting from the hinge member 94 can lodge inside the groove 117 to create a hinge axis between the first hinge member 94 and the part 98 of the second hinge member. It is considered that the two parts 96 and 98 of the second hinge member can be taken as a single member when they are in the abutting relationship shown in FIGS. 18 to 20. Thus, it is permissible to speak of a hinging relation between the first hinge member 94 and the second hinge member (parts 96 and 98) when the tongue 120 is lodged in the groove 117.

FIG. 19 shows the first hinge member 94 after it has been rotated in the clockwise direction to the point of unstable equilibrium, which arises when the two points 123 and 124, representing the hinge lines along which the biasing element 95 is attached to the surmounting portion 102 and to the first hinge member 94 respectively, are aligned with the point 126, the latter representing the line along which the tongue 120 bears against the surface of the groove 117, thereby defining an instantaneous axis of rotation of the first hinge member 94 with respect to the second hinge member comprising parts 96 and 98.

The design of the biasing portions 95a and 95b is such that they are in a state of longitudinal tension in the over-toggling position of unstable equilibrium shown in FIG. 19. Although actual stretching in the biasing portions 95a and 95b is minimal, the integral web connection between the biasing portions 95a and 95b and both the surmounting portion 102 and the first hinge member 94 will stretch or deform to a larger degree. It is important, of course, so to design the biasing members 95a and 95b that the webs aforementioned will not be stretched to rupture.

Further clockwise rotation of the hinge member 94 with respect to the composite hinge member comprising parts 96 and 98 will bring the first hinge member 94 to the FIG. 20 position, in which the hypothetical line joining points 123 and 124 has gone past the point 126. It will be apparent that, in the FIG. 20 position, the stress in the biasing portions 95a and 95b will be less than in the FIG. 19 position, and this situation will ensure that the first hinge member 94 remains biased to the FIG. 20 position. Thus, the residual tension in the biasing portions 95a and 95b will hold the two parts 96 and 98 in a tightly abutting relationship.

Figure 21:
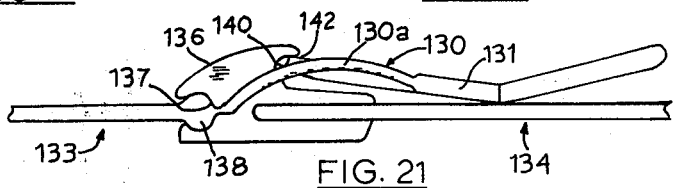
FIG. 21 is an elevational view of another variant of the fourth embodiment of this invention, wherein the biasing member is bowed in order to increase its capacity for expansion.
Figure 22:
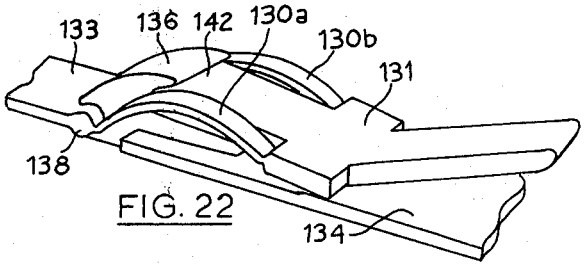
FIG. 22 is a perspective view of the variant shown in FIG. 21.

Another variant of the fourth embodiment of this invention is shown in FIGS. 21 and 22, in which it will be noted that the two portions 130a and 130b of the biasing element 130 are curved in the vertical plane. The other elements are similar to those of FIGS. 17 to 20, and include a first hinge member 131, a second hinge member consisting of a first part 133 and a second part 134, the part 134 being affixed to or integral with a grooved portion 136 which has a first groove 137 in which the rounded end 138 of the first part 133 is adapted to lodge, and a second groove 140 in which the tongue 142 of the first hinge member 131 is adapted to be received. It will be appreciated that the curved biasing portions 130a and 130b are capable of absorbing a greater deflection under tension than is the case with the straight biasing portions 95a and 95b in FIGS. 17 to 20. For this reason, the dimensional design criteria in the variant shown in FIGS. 21 and 22 are not so critical.

In the variant shown in FIGS. 17 to 20, the hinge axis denoted by the point 126 is analogous to the hinge represented by the web 75 in FIG. 13, the hinge axis denoted by the point 124 is analogous to the hinge represented by the web 78 in FIG. 13, and the hinge axis denoted by the point 123 is analogous to the hinge represented by the web 80 in FIG. 13.

It will be evident that the same over-toggling considerations hold for the second variant shown in FIGS. 21 and 22 as for the first variant shown in FIGS. 17 to 20. It is not considered necessary to show the hinge axes in the second variant of the fourth embodiment.

It will be appreciated that the fourth embodiment of this invention lends itself to integral moulding techniques, such that the element 112 could be moulded integrally with the second part 98, and such that the first hinge member 94, the biasing portions 95a and 95b and the surmounting portion 102 could all be formed integrally with the first part 96.

In the appended claims, the word "hinged" is intended to cover both an integral web hinge and a hinge employing a pivot pin. The word "pivoted" is to be construed as covering only those hinge arrangements in which some sort of pivot pin is utilized. "Pivoted" does not include an integral web hinge. The term "hingedly integral" describes the flexible web connection which is shown in FIGS. 8 and 9 between the connecting link 42 and both hinge members. The term "rigidly integral" describes the non-flexible connection which is shown in FIG. 2 between the connecting link 20 and the first hinge member 11.

While preferred embodiments of this invention have been disclosed herein, those skilled in the art will appreciate that changes and modifications may be made therein without departing from the spirit and scope of this invention as defined in the appended claims.

What I claim as my invention is:

[1. A snap-hinge comprising:

a first hinge member, a second hinge member hinged to said first hinge member about a first hinge line, a curved resilient connecting link of uniform cross-section joined at one end integrally to said first hinge member at a second hinge line and joined at the other end integrally to said second hinge member at a third hinge line, the resilient connecting link tending resiliently to maintain its two ends apart at a given spacing, said second hinge line being spaced at an invarible distance from said first hinge line, said third hinge line being spaced at an invariable distance from said first hinge line, the snap-hinge having a first position and a second position, in each of which stress in the connecting link is at a minimum, the snap-hinge being at rest in each of said positions, a small departure from either of which increases the stress in the connecting link, which tends to restore the snap-hinge to the respective position, the connecting link being capable of resilient expansion between its one end and its other end, the snap-hinge being adapted to articulate between said first-mentioned position and said second position in such a way that the connecting link is resiliently expanded in positions intermediate said first-mentioned position and said second position, the maximum expansion of said connecting link representing a state of unstable equilibrium for the snap-hinge, departure from which in either direction causes said connecting link to urge the snap-hinge further in that direction to return the snap-hinge to one of said positions.]

[2. A snap-hinge as claimed in claim 1, in which said second hinge line and said third hinge line are equidistant from said first hinge line.]

[3. A snap-hinge as claimed in claim 1, in which said first hinge member is integral with said second hinge member through a flexible web defining said first hinge line, in which said one end of said resilient connecting link is integral with said first hinge member through a flexible web defining said second hinge line, and in which said other end of said resilient connecting link is integral with said second hinge member through a flexible web defining said third hinge line.]

[4. A snap-hinge as claimed in claim 3, in which said first and second hinge members and said resilient connecting link are made of a thermoplastic material.]

[5. A snap-hinge as claimed in claim 4, in which said thermoplastic material is polypropylene.]

*6. A snap-hinge comprising:*

*a first hinge member,*

*a second hinge member hinged to said first hinge member about a first hinge line,*

*a curved resilient connecting link of uniform cross-section, the link being joined at one end integrally to said first hinge member at a second hinge line and joined at the other end integrally to said second hinge member at a third hinge line, the link being curved and said ends of substantially uniform cross-section intermediate its ends, the resilient connection link tending resiliently to maintain its two ends apart at a given spacing, said second hinge line being spaced at an invariable distance from said first hinge line, said third hinge line being spaced at an invariable distance from said first hinge line, the snap-hinge having a first position and a second position, in each of which stress in the connecting link is at a minimum, the snap-hinge being at rest in each of said positions, a small departure from either of which increases the stress in the connecting link, which tends to restore the snap-hinge to the respective position, the connecting link being capable of resilient deformation between its one end and its other end when the distance between the ends changes, the snap-hinge being adapted to articulate between said first-mentioned position and said second position in such a way that the connecting link is resiliently deformed in positions intermediate said first-mentioned position and said second position when the distance between the ends of the link changes, the maximum deformation of said connecting link representing a state of unstable equilibrium for the snap-hinge, departure from which in either direction causes said connecting link to urge the snap-hinge further in that direction to return the snap-hinge to one of said positions.*

*7. A snap-hinge as claimed in claim 6, in which said first hinge member is integral with said second hinge member through a flexible web defining said first hinge line, in which said one end of said resilient connecting link is integral with said first hinge member through a flexible web defining said second hinge line, and in which said other end of said resilient connecting link is integral with said second hinge member through a flexible web defining said third hinge line.*

*8. The snap-hinge as claimed in claim 6, wherein when said snap-hinge is in the rest position, the distance between the second hinge line and the third hinge line is less than the distance at which the maximum stress exists in the connecting link.*

*9. A snap-hinge as claimed in claim 8 wherein as the snap-hinge proceeds from the first position to the second, the distance between the second hinge line and the third hinge line increases, deforming said connecting link with said deformation continuing until a maximum point is reached, prior to reaching this maximum point the first hinged member is biased towards the first position, after exceeding this maximum point the distance between the second hinge line and the third hinge line decreases and the first hinge member is biased towards the second position, eventually realizing said position.*

*10. A snap-hinge as claimed in claim 8, wherein as the snap-hinge proceeds from the second position to the first position, the distance between the second hinge line and the third hinge line increases, deforming said connecting link with said deformation continuing until a maximum point is reached, prior to reaching this maximum point the first hinge member is biased towards the second position, after exceeding the maximum point the distance between the second hinge line and the third hinge line decreases and the first hinge member is biased towards the first position, eventually realizing said position.*

*11. A snap hinge as claimed in claim 6 wherein said resilient connecting link is curved throughout its entire length.*

*12. A snap hinge as claimed in claim 6 wherein said resilient connecting link is of uniform cross-section throughout its entire length.*

*13. A snap-hinge as claimed in claim 6, in which said second hinge line and said third hinge line are equidistant from said first hinge line.*

*14. A snap-hinge as claimed in claim 7, in which said first and second hinge members and said resilient connecting link are made of a thermoplastic material.*

*15. A snap-hinge as claimed in claim 13, in which said thermoplastic material is polypropylene.*

* * * * *

UNITED STATES PATENT AND TRADEMARK OFFICE

CERTIFICATE OF CORRECTION

PATENT NO. : Reissue 30,861

DATED : February 9, 1982

INVENTOR(S) : ALOIS A. KRAWAGNA

It is certified that error appears in the above—identified patent and that said Letters Patent is hereby corrected as shown below:

Column 1, line 55, "fourth" should be "third".

Column 7, line 51, "expanded" should be placed in brackets and --separated-- added thereto.

Column 12, line 28, delete "said ends".

Signed and Sealed this

*Fifth* Day of *April 1983*

[SEAL]

*Attest:*

GERALD J. MOSSINGHOFF

*Attesting Officer*

*Commissioner of Patents and Trademarks*